United States Patent
Wang et al.

(10) Patent No.: US 11,242,433 B2
(45) Date of Patent: Feb. 8, 2022

(54) SOLID-LIQUID SEPARATION DEVICE AND METHOD FOR WASHING LIGNOCELLULOSIC SOLID RESIDUE

(71) Applicant: GUANGZHOU INSTITUTE OF ENERGY CONVERSION, CHINESE ACADEMY OF SCIENCES, Guangzhou (CN)

(72) Inventors: Wen Wang, Guangzhou (CN); Xinshu Zhuang, Guangzhou (CN); Xuesong Tan, Guangzhou (CN); Qiong Wang, Guangzhou (CN); Qiang Yu, Guangzhou (CN); Wei Qi, Guangzhou (CN); Zhongming Wang, Guangzhou (CN)

(73) Assignee: GUANGZHOU INSTITUTE OF ENERGY CONVERSION, ACADEMY OF SCIENCES, Guangzhou (CN)

( * ) Notice: Subject to any disclaimer, the term of this patent is extended or adjusted under 35 U.S.C. 154(b) by 363 days.

(21) Appl. No.: 16/476,558

(22) PCT Filed: Nov. 21, 2018

(86) PCT No.: PCT/CN2018/116788
§ 371 (c)(1),
(2) Date: Jul. 9, 2019

(87) PCT Pub. No.: WO2020/000882
PCT Pub. Date: Jan. 2, 2020

(65) Prior Publication Data
US 2021/0332195 A1    Oct. 28, 2021

(30) Foreign Application Priority Data
Jun. 26, 2018    (CN) .......................... 201810672704.1

(51) Int. Cl.
*C08H 8/00* (2010.01)
*B01F 7/00* (2006.01)
(Continued)

(52) U.S. Cl.
CPC .......... *C08H 8/00* (2013.01); *B01F 7/00291* (2013.01); *C02F 11/122* (2013.01); *C08L 97/02* (2013.01)

(58) Field of Classification Search
CPC ................................ C02F 11/122; B30B 9/04
See application file for complete search history.

(56) References Cited

U.S. PATENT DOCUMENTS 3,290,891 A * 12/1966 De Lano, Jr. .......... B01D 9/004
    62/534
3,777,892 A * 12/1973 Thijssen et al. ....... B01D 33/70
    210/178
(Continued)

FOREIGN PATENT DOCUMENTS

CN    106007230 A    10/2016
CN    206526571 U    9/2017
(Continued)

OTHER PUBLICATIONS

Kriegel (Industrial and Engineering Chemistry, vol. 30(11), 1211-1213, 1938) (Year: 1938).*
(Continued)

*Primary Examiner* — Liam J Heincer
(74) *Attorney, Agent, or Firm* — Bayramoglu Law Offices LLC

(57) ABSTRACT

A solid-liquid separation device includes a kettle body, a piston, a stirrer, a separation plate having filtration pores, and a filtration mesh. The kettle body is hollow along an axial direction to form a chamber body. The separation plate is fitly installed in the chamber body, and divides the (Continued)

chamber body into a washing chamber and a draining chamber. The piston and the stirrer are fitly disposed in the washing chamber. The filtration mesh is attached on a side of the separation plate to cover the filtration pores. The kettle body is further provided with a feed inlet, a water inlet, a material outlet, and a liquid outlet. The feed inlet and material outlet are communicated with the washing chamber, and the water inlet and the liquid outlet are communicated with the draining chamber. The method includes the following steps: feeding, solid-liquid separation, washing, and material discharge.

11 Claims, 1 Drawing Sheet

(51) Int. Cl.
*C02F 11/122* (2019.01)
*C08L 97/02* (2006.01)

(56) References Cited

U.S. PATENT DOCUMENTS

| | | | | |
|---|---|---|---|---|
| 3,872,009 | A * | 3/1975 | Thijssen | B01D 11/0223 210/178 |
| 4,022,691 | A | 5/1977 | Heinrich | |
| 4,975,183 | A * | 12/1990 | Glorer | B01D 29/6476 210/107 |
| 5,316,685 | A * | 5/1994 | Stein | B07B 1/06 210/380.1 |
| 5,616,357 | A * | 4/1997 | Hartmann | A23N 1/00 426/478 |
| 5,658,463 | A * | 8/1997 | Rubio | B01D 11/0253 210/634 |
| 6,089,147 | A * | 7/2000 | Rodriguez | B30B 9/04 100/37 |
| 2006/0273047 | A1* | 12/2006 | Newkirk | B30B 9/12 210/780 |
| 2017/0296946 | A1* | 10/2017 | Vette | B01D 29/661 |
| 2018/0161706 | A1* | 6/2018 | Masetto | B01D 29/05 |
| 2019/0216271 | A1* | 7/2019 | Torres | A47K 11/023 |
| 2021/0236965 | A1* | 8/2021 | Riedel | B01D 29/86 |

FOREIGN PATENT DOCUMENTS

| | | |
|---|---|---|
| CN | 206613211 U | 11/2017 |
| CN | 108165365 A | 6/2018 |
| CN | 108187388 A | 6/2018 |

OTHER PUBLICATIONS

Korey (Difference between Gate Valves and Ball Valves, https://www.commercial-industrial-supply.com/resource-center/difference-gate-valves-vs-ball-valves/) (Year: 2017).*

* cited by examiner

SOLID-LIQUID SEPARATION DEVICE AND METHOD FOR WASHING LIGNOCELLULOSIC SOLID RESIDUE

CROSS REFERENCE TO RELATED APPLICATIONS

This application is the national phase entry of International Application PCT/CN2018/116788, filed on Nov. 21, 2018 which is based upon and claims priority to Chinese Patent Application No. CN201810672704.1, filed on Jun. 26, 2018 the entire contents of which are incorporated herein by reference.

TECHNICAL FIELD

The present invention relates to the field of waste resource utilization, energy conservation and emission reduction, and particularly relates to a solid-liquid separation device and a method for washing a lignocellulosic solid residue.

BACKGROUND

Lignocellulose includes resources such as crop straws and wastes from forestry production and processing, mainly composed of cellulose, hemicellulose and lignin. Cellulose and hemicellulose can be converted by enzymolysis into platform chemicals, monosaccharides such as glucose and xylose, which can be further converted by biological or chemical catalysis into high value-added biochemical products such as ethanol, lactic acid and citric acid. Lignin can be used as a raw material in preparing water reducers, binders, adsorbents, etc. However, lignocellulose has a compact structure which hinders the efficient enzymolysis of cellulose and hemicellulose. Pretreatments can destroy the compact structure of lignocellulose, facilitating the enzymolysis of cellulose and hemicellulose. There are various pretreatment techniques, mainly classified into four categories, physical methods, chemical methods, biological methods, and combined methods. Typically, during the pretreatment of lignocellulose, substances that inhibit enzymolysis and fermentation will be produced. Repetitive washing and solid-liquid separation can significantly reduce or even eliminate the residual amount of the inhibitory substances in lignocellulosic solid residues, facilitating the subsequent efficient enzymolysis and fermentation. In current techniques, multi-screw extrusion is adopted to achieve the repetitive washing, solid-liquid separation and material transportation of lignocellulosic solid residues, which involves many steps and high cost.

SUMMARY

In view of the deficiencies of the prior art, one object of this invention is to provide a solid-liquid separation device for repeatedly washing lignocellulosic solid residues, which can reduce the number of steps and the cost.

In order to achieve the above object, this invention employs the following technical solution.

A solid-liquid separation device, for repeatedly washing a lignocellulosic solid residue, comprises a kettle body, a piston, a stirrer, a separation plate having filtration pores, and a filtration mesh.

The kettle body is hollow along an axial direction to form a chamber body. The separation plate is fitly installed in the chamber body, and divides the chamber body into two sections, a washing chamber and a draining chamber. The piston and the stirrer are fitly disposed in the washing chamber. The filtration mesh is attached on a side of the separation plate that faces the stirrer, and covers the filtration pores of the separation plate.

The kettle body is further provided with a feed inlet, a water inlet, a material outlet, and a liquid outlet. The feed inlet and material outlet are communicated with the washing chamber, and the water inlet and the liquid outlet are communicated with the draining chamber.

The feed inlet is positioned higher than the material outlet, and the water inlet is positioned higher than the liquid outlet.

The kettle body is placed with a slope angle $\leq 5°$ to make the liquid outlet positioned at a lowest point.

The feed inlet, the water inlet, the material outlet and the liquid outlet are provided with ball valves.

The water inlet is further provided with a flow meter.

The kettle body is further provided with a window for observing an inside of the chamber body.

The feed inlet is 10 to 20 mm away from a starting position of the piston, and the material outlet is positioned directly below the stirrer.

Caliber sizes of the feed inlet and the material outlet are larger than those of the water inlet and the liquid outlet.

A diameter of the filtration pores is 10 to 20 mm, and a mesh diameter of the filtration mesh is smaller than a material diameter.

Another object of this invention is to provide a method for repeatedly washing a lignocellulosic solid residue which can be performed by employing the above solid-liquid separation device and comprises the following steps.

S1. Feeding

Pretreated lignocellulosic slurry is fed into the washing chamber of the kettle body through the feed inlet.

S2. Solid-Liquid Separation

The piston is pushed towards the stirrer to squeeze the lignocellulose slurry. A liquid contained in the slurry flows into the draining chamber through the filtration mesh and the filtration pores. The liquid outlet is opened to discharge the waste liquid. The lignocellulosic solid residue is trapped in the washing chamber, and the residual liquid in the lignocellulosic solid residue is squeezed out as the piston is moving on. Finally the solid-liquid separation is achieved.

S3. Washing

After the solid-liquid separation, the piston is back to the starting position. The liquid outlet is closed. The stirrer is switched on to break up the solid residue, and then it is switched off. The water inlet is opened to allow sufficient water into the chamber body at a liquid-solid ratio of 6:1 to 10:1, and then the water inlet is closed. The stirrer is switched on and stirs at 100 to 300 rpm for 5 to 10 minutes, and then it is turned off. The solid-liquid separation is carried out according to the step S2. The steps S2 and S3 can be performed to repeatedly wash the lignocellulosic solid residue in the kettle body.

S4. Material Discharge

After the steps of washing and solid-liquid separation, the piston is pulled back for 10 to 50 mm. The stirrer is turned on to break up the solid residue, and then it is switched off. The material outlet is opened, and the piston is pushed towards the material outlet to convey the lignocellulosic solid residue to a subsequent reaction kettle through the material outlet. After the material discharge is completed, the material outlet is closed, and the piston is pulled back to the starting position, to prepare for washing a next batch of material.

This invention has the following advantages.

The application of this solid-liquid separation device can not only realize the repetitive washing and solid-liquid separation of lignocellulosic solid residues, but also transport materials, simplify the process route, and effectively connect the pretreatment process and enzymatic hydrolysis process of lignocellulose. Moreover, this solid-liquid separation device has the advantages of ingenious design, simple structure, and low production cost, making it widely applicable.

DETAILED DESCRIPTION OF THE EMBODIMENTS

This invention will be further illustrated by the following embodiments and figures.

Figure 1:
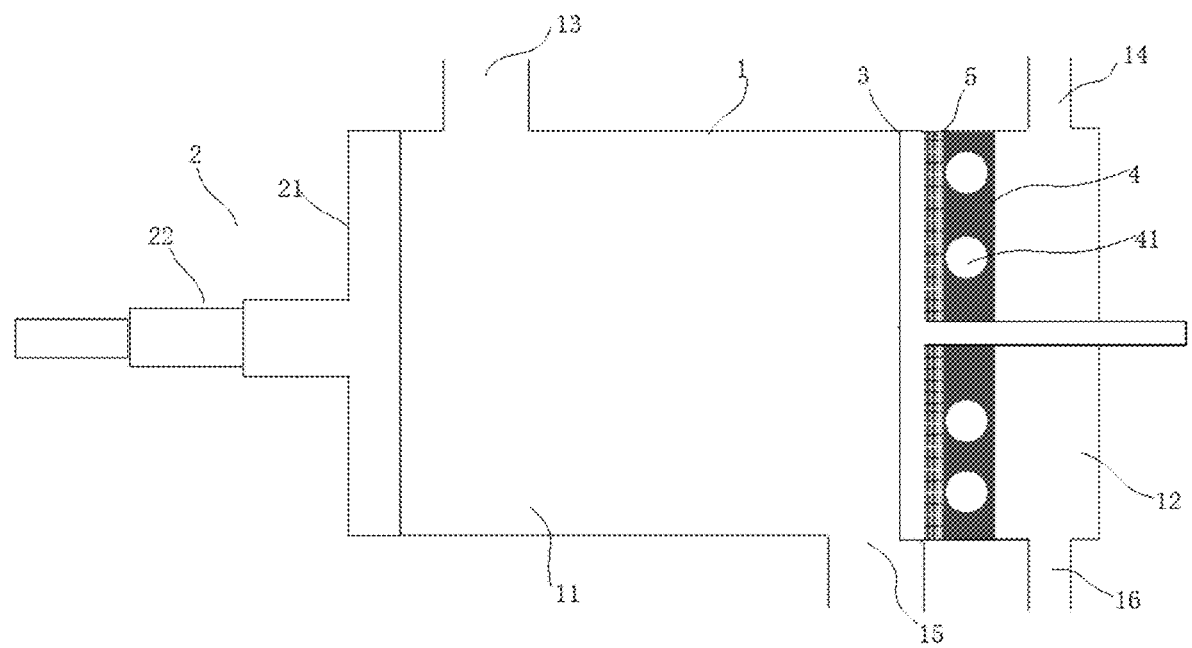
FIG. 1 is a schematic diagram of the solid-liquid separation device provided in one embodiment of this invention.

As shown in FIG. 1, the solid-liquid separation device provided in this embodiment includes a kettle body 1, a piston 2, a stirrer 3, a separation plate 4 having filtration pores 41, and a filtration mesh 5.

Figure 2:
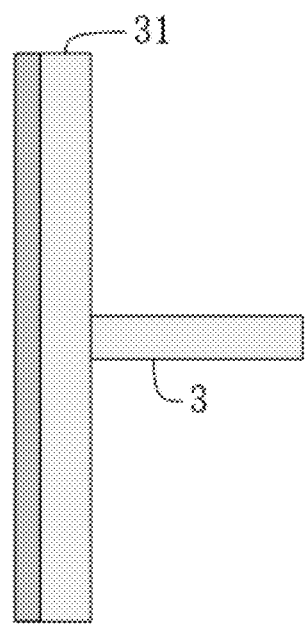
FIG. 2 shows the structure of a blade stirrer.
Reference signs in the figures: 1: kettle body; 2: piston; 3: stirrer; 4: separation plate, 5: filtration mesh; 11: washing chamber; 12: draining chamber; 13: feed inlet; 14: water inlet; 15: material outlet; 16: liquid outlet; 21: piston body; 22: push-pull rod; 41: filtration pore; 31: blade.

The kettle body 1 is hollow along an axial direction to form a chamber body. The separation plate 4 is fitly installed in the chamber body, and divides the chamber body into two sections, a washing chamber 11 and a draining chamber 12. The length of the draining chamber 12 is 1% to 10% of that of the washing chamber 11. The piston 2 and the stirrer 3 are fitly disposed in the washing chamber 11. The piston 2 is mainly composed of a piston body 21 and a push-pull rod 22. The piston body 21 is capable of moving forth and back in the washing chamber 11 under the pushing and pulling actions of the rod 22. The filtration mesh 5 is attached on the side of the separation plate 4 which faces the stirrer 3 to cover the filtration pores 41 of the separation plate 4. Specifically, the diameter of the filtration pores 41 is 10 to 20 mm, and the mesh diameter of the filtration mesh is smaller than the diameter of material, which can effectively realize the squeezing and filtration of solid residues. The stirrer 3 is a paddle type stirrer. As shown in FIG. 2, the stirrer 3 has 2 to 6 blades 31 which are cylindrical or cuboid with a 90% to 95% length of the inner diameter of the washing chamber 11. The blades are positioned in the same plane, and their width and height depends on the amount of the material to be treated to realize an efficient stirring.

The kettle body 1 is further provided with a feed inlet 13, a water inlet 14, a material outlet 15 and a liquid outlet 16. The feed inlet 13 and material outlet 15 are communicated with the washing chamber 11, and the feed inlet 13 is positioned higher than the material outlet 15. The feed inlet 13 is 10 to 20 mm away from the starting position of the piston 2, which facilitates the piston 2 to squeeze the solid residues, while the material outlet 15 is positioned directly below the stirrer 3, which facilitates the discharging of the residues after the stirring. The water inlet 14 and the liquid outlet 16 are communicated with the draining chamber 12, and the water inlet 14 is positioned higher than the liquid outlet 16 to easily discharge the residual liquid through the liquid outlet 16 when the solid residues are squeezed by the piston 2.

The feed inlet 13, the water inlet 14, the material outlet 15 and the liquid outlet 16 are equipped with ball valves to easily control these openings. In addition, the water inlet 14 is further provided with a flow meter to monitor the quantity of water to realize the efficiently repetitive washing of lignocellulosic solid residues. Meanwhile, in order to facilitate the feeding and discharging of the solid residues, caliber sizes of the feed inlet 13 and the material outlet 15 are larger than those of the water inlet 14 and the liquid outlet 16.

Moreover, in order to facilitate the liquid discharging of the liquid outlet 16, and hardly affect the material discharging of the material outlet 15, the kettle body 1 is placed at a slope angle ≤5° that the side with the piston 2 is at a higher position while the side with the stirrer 3 is at a lower position. Also, a window for observation is provided at the surface of the kettle body.

Another object of this invention is to provide a method for repeatedly washing a lignocellulosic solid residue which can be performed by employing the above solid-liquid separation device and comprises the following steps.

S1. Feeding
The pretreated lignocellulosic slurry is fed into the washing chamber 11 of the kettle body 1 through the feed inlet.

S2. Solid-liquid separation
The piston 2 is pushed towards the stirrer 3 to squeeze the lignocellulose slurry. The liquid contained in the slurry flows into the draining chamber 12 through the filtration mesh 5 and the filtration pores 41. The liquid outlet 16 is opened to discharge the waste liquid. The lignocellulosic solid residue is trapped in the washing chamber 11, and the residual liquid in the lignocellulosic solid residue is squeezed out as the piston 2 is moving on. Finally the solid-liquid separation is achieved.

S3. Washing
After the solid-liquid separation, the piston 2 is back to the starting position. The liquid outlet 16 is closed. The stirrer 3 is switched on to break up the solid residue, and then it is switched off. The water inlet 14 is opened to allow sufficient water into the chamber body at a liquid-solid ratio of 6:1 to 10:1, and then the water inlet 14 is closed. The stirrer 3 is switched on and stirs at 100 to 300 rpm for 5 to 10 minutes, and then it is turned off. The solid-liquid separation is carried out according to the step S2. The steps S2 and S3 can be performed to repeatedly wash the lignocellulosic solid residue in the kettle body 1.

S4. Material Discharge
After the steps of washing and solid-liquid separation, the piston 2 is pulled back for 10 to 50 mm. The stirrer 3 is turned on to break up the solid residue, and then it is switched off. The material outlet 15 is opened, and the piston 2 is pushed towards the material outlet 15 to convey the lignocellulosic solid residue to the subsequent reaction kettle through the material outlet 15. After the material discharge is completed, the material outlet 15 is closed, and the piston 2 is pulled back to the starting position for washing the next batch of material.

As can be concluded from the above description, the application of this solid-liquid separation device can not only realize the repetitive washing and solid-liquid separation of lignocellulosic solid residues, but also transport materials, simplify the process route, and effectively connect the pretreatment process and enzymatic hydrolysis process of lignocellulose. Moreover, this solid-liquid separation device has the advantages of ingenious design, simple structure, and low production cost, making it widely applicable.

Based on the above-described technical solutions and concepts, a skilled person in the art is able to make various changes or modifications which shall fall within the scope of the claims.

What is claimed is:

1. A solid-liquid separation device for repeatedly washing a lignocellulosic solid residue, comprising a kettle body, a piston, a stirrer, a separation plate provided with filtration pores, and a filtration mesh; wherein,
the kettle body is hollow along an axial direction of the kettle body to form a chamber body; the separation plate is fitly installed in the chamber body, the chamber body is divided into two sections by the separation plate, and the two sections comprise a washing chamber and a draining chamber; the piston and the stirrer are fitly disposed in the washing chamber; the filtration mesh is attached on a side of the separation plate facing the stirrer, and the filtration pores of the separation plate are covered by the filtration mesh, and wherein the stirrer is a paddle type stirrer where blades of the paddle type stirrer are cylindrical or cuboid;
the kettle body is further provided with a feed inlet, a water inlet, a material outlet, and a liquid outlet; the feed inlet and the material outlet are communicated with the washing chamber, and the water inlet and the liquid outlet are communicated with the draining chamber.

2. The solid-liquid separation device of claim 1, wherein the feed inlet is positioned higher than the material outlet, and the water inlet is positioned higher than the liquid outlet.

3. The solid-liquid separation device of claim 1, wherein the kettle body is placed with a slope angle ≤5° to make the liquid outlet positioned at a lowest point.

4. The solid-liquid separation device of claim 1, wherein the feed inlet, the water inlet, the material outlet and the liquid outlet are provided with ball valves.

5. The solid-liquid separation device of claim 4, wherein the water inlet is further provided with a flow meter.

6. The solid-liquid separation device of claim 4, wherein the feed inlet is 10 to 20 mm away from a starting position of the piston, and the material outlet is positioned directly below the stirrer.

7. The solid-liquid separation device of claim 4, wherein caliber sizes of the feed inlet and the material outlet are larger than caliber sizes of the water inlet and the liquid outlet; a diameter of the filtration pores is 10 to 20 mm, and a mesh diameter of the filtration mesh is smaller than a material diameter.

8. The solid-liquid separation device of claim 1, wherein the kettle body is further provided with a window for observing an inside of the chamber body.

9. A method for repeatedly washing a lignocellulosic solid residue by employing the solid-liquid separation device of claim 1, comprising:
S1: feeding
feeding a pretreated lignocellulosic slurry into the washing chamber of the kettle body through the feed inlet;
S2: solid-liquid separation
pushing the piston towards the stirrer to squeeze the pretreated lignocellulose slurry and thereby a liquid contained in the slurry flows into the draining chamber through the filtration mesh and the filtration pores; opening the liquid outlet to discharge the liquid; the lignocellulosic solid residue is trapped in the washing chamber, and the liquid in the lignocellulosic solid residue is squeezed out as the piston is moving onto achieve the solid-liquid separation;
S3: washing
after the solid-liquid separation, pulling the piston back to the starting position, and closing the liquid outlet; switching on the stirrer to break up the lignocellulosic solid residue, and then switching off the stirrer; opening the water inlet to allow sufficient water into the chamber body at a liquid-solid ratio of 6:1 to 10:1, and then closing the water inlet; switching on the stirrer to stir at 100 to 300 rpm for 5 to 10 minutes, and then switching off the stirrer; performing the solid-liquid separation according to the step S2; repeating the steps S2 and S3 to repeatedly wash the lignocellulosic solid residue in the kettle body;
S4: material discharge
after the steps of washing and solid-liquid separation, pulling the piston back for 10 to 50 mm; switching on the stirrer to break up the lignocellulosic solid residue, and then switching off the stirrer; opening the material outlet, and pushing the piston towards the material outlet to convey the lignocellulosic solid residue to a subsequent reaction kettle through the material outlet; after a material discharge is completed, closing the material outlet, and pulling the piston back to the starting position, to prepare for washing a next batch of material.

10. The solid-liquid separation device of claim 1, wherein the kettle body is placed with a slope angle ≤5° to make the liquid outlet positioned at a lowest point.

11. The solid-liquid separation device of claim 2, wherein the feed inlet, the water inlet, the material outlet and the liquid outlet are provided with ball valves.

* * * * *

UNITED STATES PATENT AND TRADEMARK OFFICE
CERTIFICATE OF CORRECTION

PATENT NO. : 11,242,433 B2
APPLICATION NO. : 16/476558
DATED : February 8, 2022
INVENTOR(S) : Wen Wang et al.

Page 1 of 1

It is certified that error appears in the above-identified patent and that said Letters Patent is hereby corrected as shown below:

On the Title Page

In item (73), The Assignee's Name should read as below:
--GUANGZHOU INSTITUTE OF ENERGY CONVERSION, CHINESE ACADEMY OF SCIENCES--

Signed and Sealed this
Twenty-sixth Day of April, 2022

Katherine Kelly Vidal
*Director of the United States Patent and Trademark Office*